(12) United States Patent
Choi et al.

(10) Patent No.: US 7,193,516 B2
(45) Date of Patent: Mar. 20, 2007

(54) RADIO FREQUENCY IDENTIFICATION TAG APPARATUS FOR TIRE IN RADIO FREQUENCY IDENTIFICATION SYSTEM

(75) Inventors: Sang Hoon Choi, Icheon (KR); Dong Pil Chun, Icheon (KR); Dae Hyuk Kwon, Icheon (KR); Heu Kyong Na, Icheon (KR); Sang Kook Kim, Icheon (KR); Hang Kee Cho, Icheon (KR); Won Jo Lee, Icheon (KR)

(73) Assignee: Hyundai Autonet Co., Ltd., Icheon-Si (KR)

( * ) Notice: Subject to any disclaimer, the term of this patent is extended or adjusted under 35 U.S.C. 154(b) by 181 days.

(21) Appl. No.: 10/905,287

(22) Filed: Dec. 23, 2004

(65) Prior Publication Data

US 2006/0097870 A1    May 11, 2006

(30) Foreign Application Priority Data

Nov. 2, 2004    (KR) ............... 10-2004-0088209

(51) Int. Cl.
*G08B 13/14* (2006.01)

(52) U.S. Cl. ............ 340/572.1; 340/442; 340/447; 73/146.5; 343/806

(58) Field of Classification Search ......... 340/572.1, 340/572.7, 572.8, 442, 443, 445, 447, 804; 73/146, 146.4, 146.5; 343/803, 806
See application file for complete search history.

(56) References Cited

U.S. PATENT DOCUMENTS 6,140,146 A * 10/2000 Brady et al. ............... 438/62
6,463,798 B2 * 10/2002 Niekerk et al. ............ 73/146.2
6,518,885 B1 * 2/2003 Brady et al. ............. 340/572.7
7,015,802 B2 * 3/2006 Forster ....................... 340/445
7,017,822 B2 * 3/2006 Aisenbrey .................. 235/487

FOREIGN PATENT DOCUMENTS

KR    10-2004-0027637    4/2004
KR    10-0432875    5/2004

* cited by examiner

*Primary Examiner*—Toan N. Pham
(74) *Attorney, Agent, or Firm*—John K. Park; Park Law Firm (57) ABSTRACT

The present invention discloses a radio frequency identification tag apparatus for a tire in a radio frequency identification system (hereinafter, referred to as a 'RFID system'). The radio frequency identification tag apparatus for a tire in a radio frequency identification system, which has a reader for transmitting a strong radio frequency signal to peripheral areas, comprises: a substrate with a plurality of holes having a predetermined shape; a radio chip housed in the substrate, storing the characteristic information of the tire, and operated upon receipt of the radio frequency signal to modulate the characteristic information and output them in the radio frequency signal received from the reader; and an antenna housed in the substrate, having a symmetrically uniform flexion shape relative to the radio chip, receiving the radio frequency signal to provide the same to the radio chip, and receiving the radio signal containing the characteristic information from the radio chip to transmit the same in midair.

15 Claims, 12 Drawing Sheets

Prior Art

FIG. 1

Prior Art

RADIO FREQUENCY IDENTIFICATION TAG APPARATUS FOR TIRE IN RADIO FREQUENCY IDENTIFICATION SYSTEM

BACKGROUND OF THE INVENTION

1. Field of the Invention

The present invention relates to a radio frequency identification tag apparatus for a tire in a radio frequency identification system (hereinafter, referred to as a 'RFID system'), and more particularly to, a radio frequency identification tag apparatus for a tire.

2. Description of the Background Art

Recently, the ubiquitous RFID technology is rising. The term 'ubiquitous' means a radio communication environment where a user can access freely to a network regardless of location without being conscious of a computer or network. The RFID is a key factor which becomes a clue to the ubiquitous computing revolution, which enables to send and receive data on the history of items necessary for daily life, commodities, etc. by embedding radio chips, instead of conventional barcodes, for storing the history of the items or commodities in the items or commodities. Thus the RFID is applicable to the history, distribution, inventory control, burglarproof, etc. of every items and commodities.

Especially, one example of the fields the RFID is applicable to may include a tire. The RFID is mounted to tires of an automobile, and it not only can be applied to the history, distribution, inventory control, burglarproof, etc. of a tire, but it may also settle disputes which may be raised upon occurrence of an accident caused by the tire.

The RFID system applicable to tires is comprised of an RFID tag (or transponder) storing even characteristic information of a tire in the tire, an RFID reader for executing the functions of reading and decoding the characteristic information of the tire, a host computer, a network and an application program.

Figure 1:
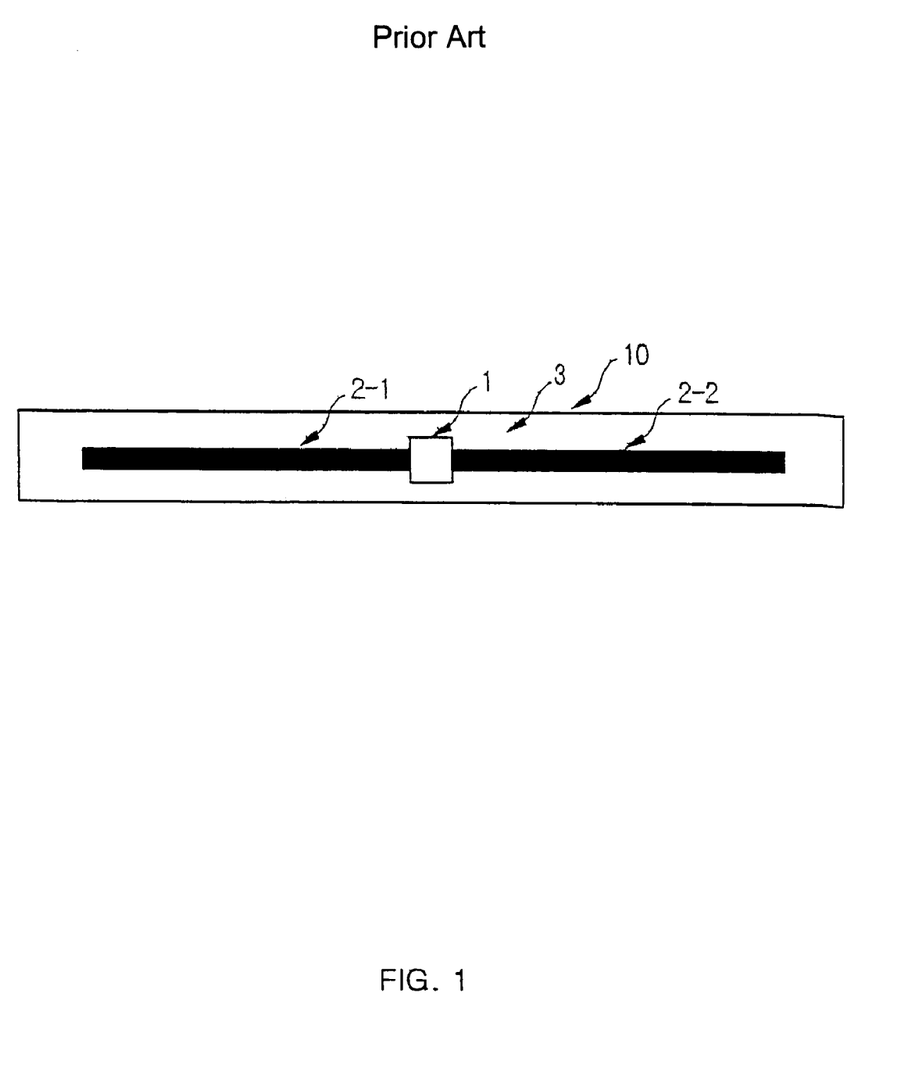
FIG. 1 is a view showing a general radio frequency identification tag apparatus.
Figure 2A:
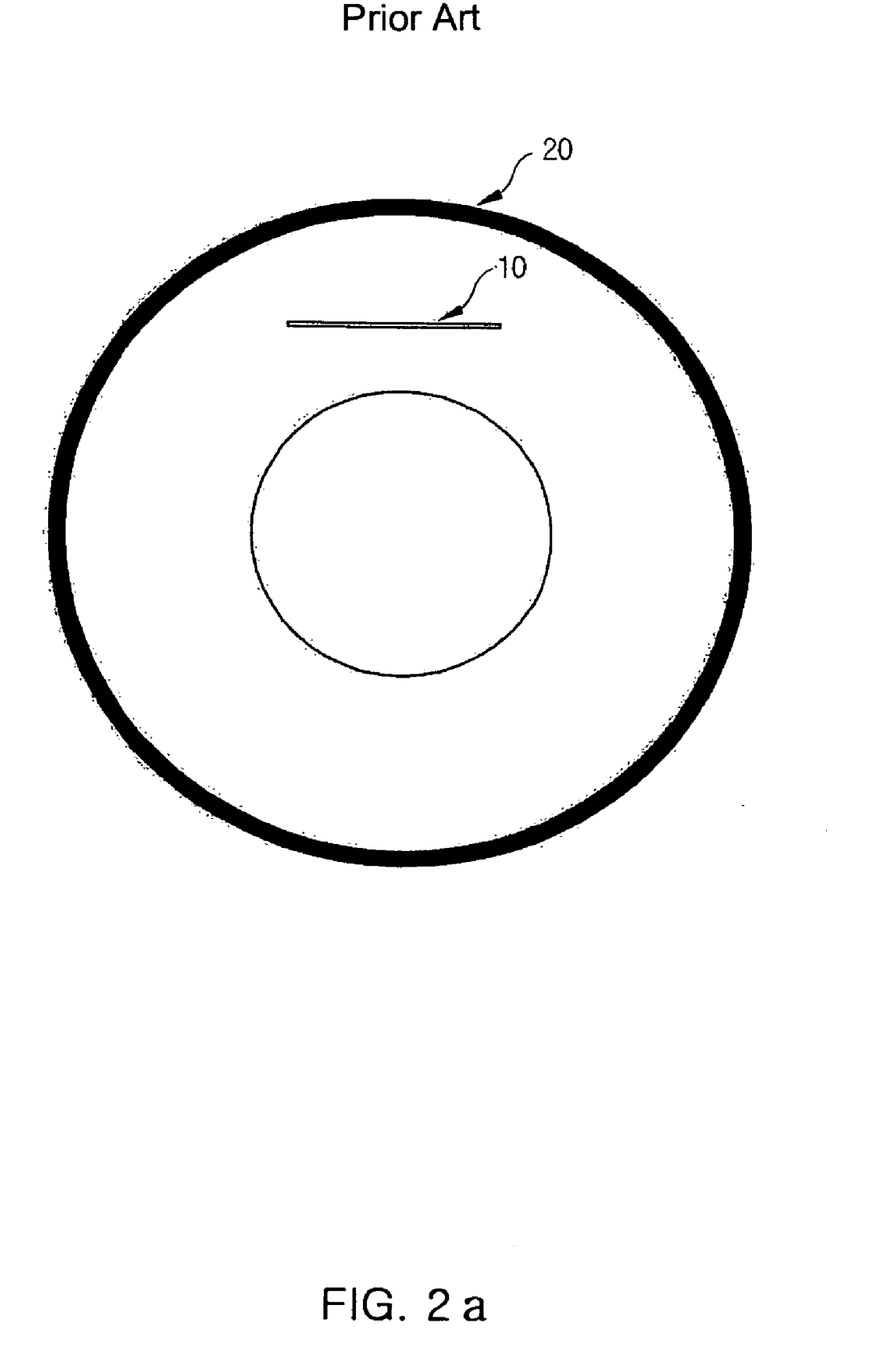
FIG. 2a is a front view of a tire in case a general radio frequency identification tag for a tire is inserted into the tire.
Figure 2B:
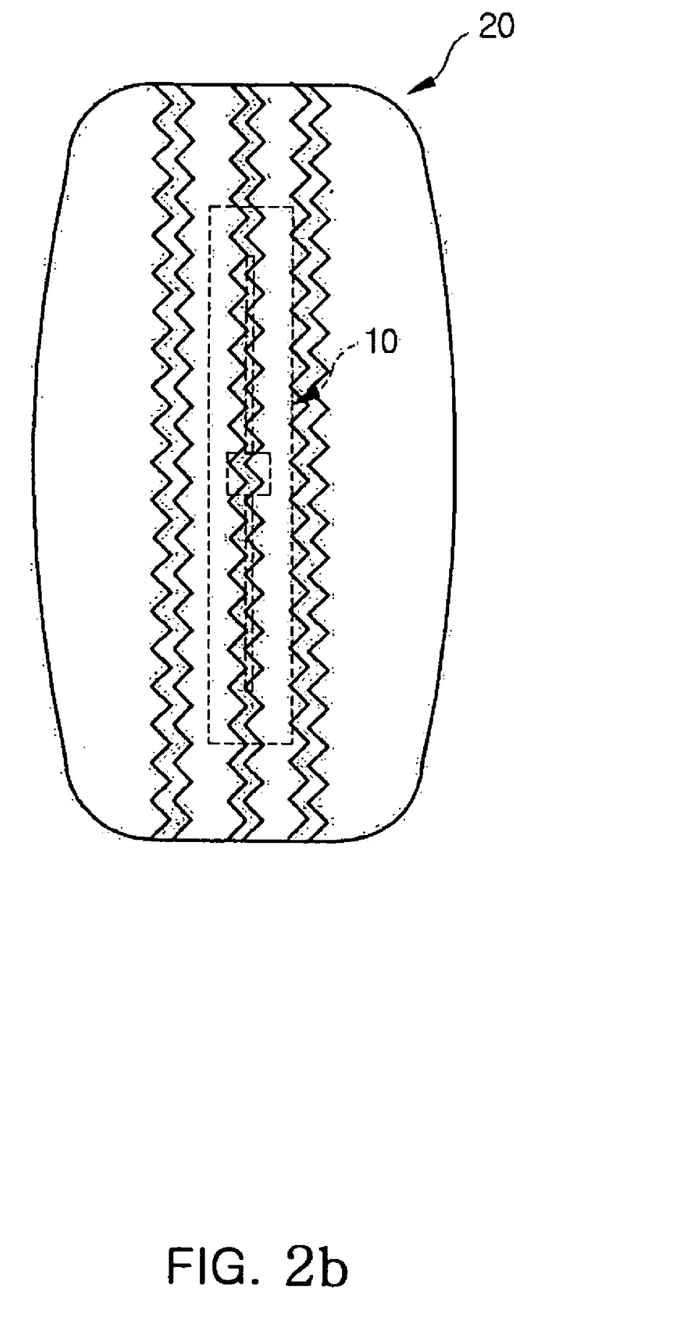
FIG. 2b is a front perspective view of a tire in case a general radio frequency identification tag is inserted into the tire.

FIG. 1 is a view showing a general radio frequency identification tag apparatus. FIG. 2a is a front view of a tire in case a general radio frequency identification tag for a tire is inserted into the tire. FIG. 2b is a front perspective view of a tire in case a general radio frequency identification tag is inserted into the tire. Hereinafter, an RFID tag apparatus applicable to a tire and a method of inserting the same into a tire will be described with reference to FIGS. 1 and 2.

Reference numeral 10 in the drawings is a RFID tag. The RFID tag 10 comprises a radio chip 1, an antenna 2 and a flexible substrate 3.

The antenna 2-1 and 2-2 creates a radio frequency signal transmitted from a reader to provide it to the radio chip 1, and transmits a radio signal outputted from the radio chip 1 into midair. Typically, the above radio frequency signal is a radio frequency in an ultra high frequency band The radio chip 1 is provided with a memory storing characteristic information for the history, distribution, inventory control, etc. of a tire, receives a radio frequency signal from the antenna 2-1 and 2-2 and rectifies it, modulates the characteristic information of the tire by the rectified voltage and outputs them to the antenna 2-1 and 2-2 in the radio signal transmitted from the reader. The radio signal transmitted through the antenna 2-1 and 2-2 is transmitted to a reader. The re-transmission of characteristic information in a radio frequency signal transmitted from the reader is generally referred to as backscattering.

The RFID tag 10 for a tire thus constructed is inserted into a tire 20 as shown in FIGS. 2a and 2b. It is preferable that the RFID tag 10 is arranged at a location that is not affected by the friction of the tire 20 and not bent by the curve of the tire 20. Further, it is preferable that the RFID tag is inserted so as not to move within the tire 20.

However, the tire 20 is made of rubber while the RFID tag 10 is constructed as a case made of resin or a flexible substrate 3 as shown in FIG. 1. Therefore, since the RFID tag 10 to be mounted within the automobile tire 20 is constructed of an essentially different medium with the material of the tire, its adherability with the tire 20 of rubber becomes lowered. For this reason, only a two-dimensional barcode is currently being touched as a technique practically applicable at a site.

As described above, since the tire and the RFID are constructed of a different heterogeneous medium, this leads to a problem that the adherability between the tire and the RFID tag becomes lowered.

Further, because the adherability between the tire and the RFID tag is lowered, this may bring about a secular change in the apparatus aspect, such as a change of a metallic antenna or substrate. Resultantly, this may lead to the deterioration of RF characteristics which can be referred to as the index of RFID performance.

Further, due to an apparatus problem that the tire is lack of an element playing the role of supporting except for rubber layers surrounding the tire, there is a high possibility that the stimulus of a heterogeneous medium will be applied to the rubber layers as the RFID tag is shifted within the tire, which may bring about a defect such as a tire burst.

SUMMARY OF THE INVENTION

Therefore, an object of the present invention is to provide a radio frequency identification tag apparatus which is able to increase the adherability between a radio frequency identification tag for a tire and the tire and improve the impedance characteristic of an antenna by forming holes on the radio frequency identification tag in various shapes.

To achieve the above object, there is provided a radio frequency identification tag apparatus for a tire in a radio frequency identification system according to the present invention, which has a reader for generating a strong radio frequency signal to peripheral areas, comprising: a substrate with a plurality of holes having a predetermined shape; a radio chip housed in the substrate, storing the characteristic information of the tire, and operated upon receipt of the radio frequency signal to modulate the characteristic information and output them in the radio frequency signal received from the reader; and an antenna housed in the substrate, having a symmetrically uniform flexion shape relative to the radio chip, receiving the radio frequency signal to provide the same to the radio chip, and receiving the radio signal containing the characteristic information from the radio chip to transmit the same in midair.

DETAILED DESCRIPTION OF THE PREFERRED EMBODIMENTS

Preferred embodiments of the present invention will now be described in detail with reference to the accompanying drawings. In the following description, only parts needed to understand operation according to the present invention will be described and other details are omitted so as not to obscure the subject matter of the present invention.

Figure 3:
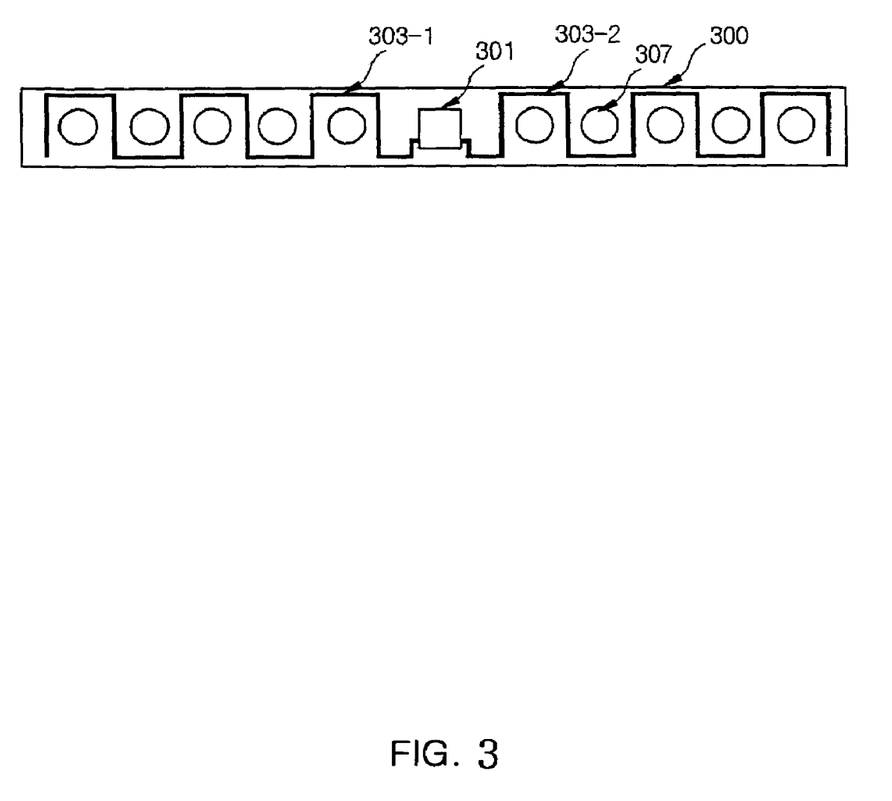
FIG. 3 is a view showing a radio frequency identification tag apparatus for a tire according to a first embodiment of the present invention.
Figure 4:
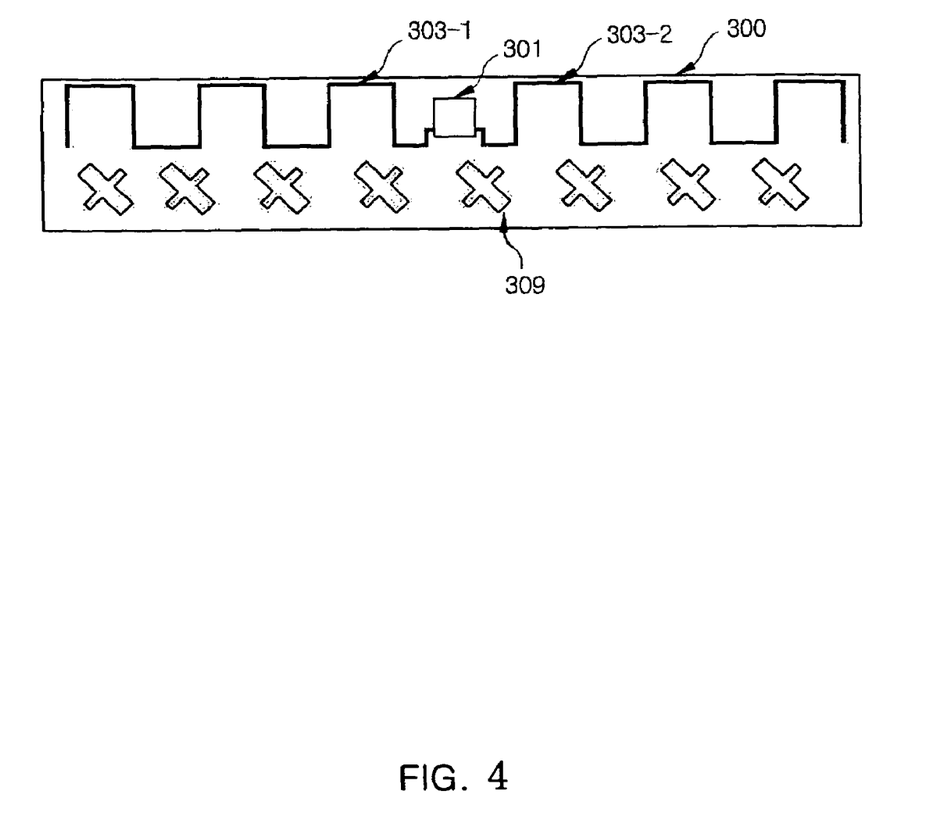
FIG. 4 is a view showing a radio frequency identification tag apparatus for a tire according to a second embodiment of the present invention.
Figure 5A:
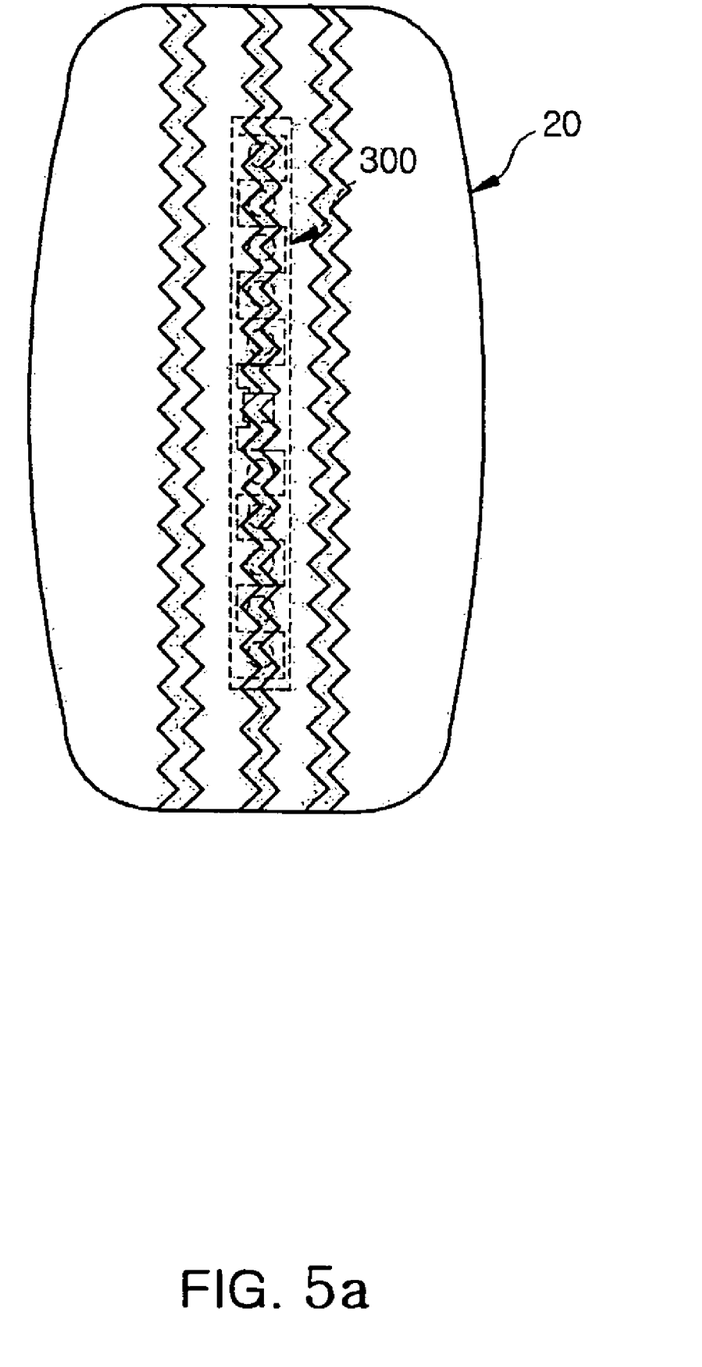
FIG. 5a is a plane perspective view of a tire in case the radio frequency identification tag for a tire of the first embodiment is inserted into the tire.
Figure 5B:
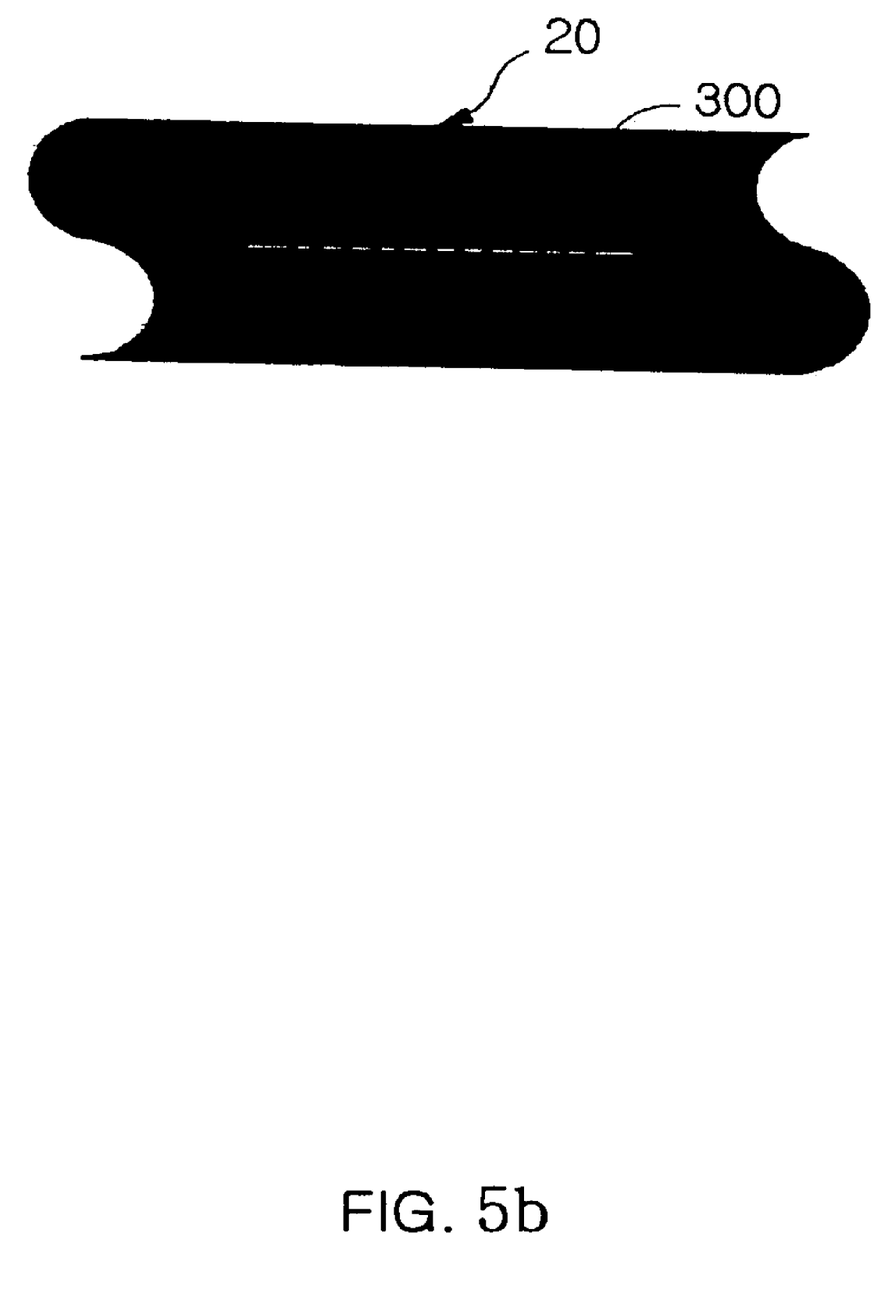
FIG. 5b is a side perspective view of a tire in case the radio frequency identification tag for a tire of the first embodiment is inserted into the tire.

FIG. 3 is a view showing a radio frequency identification tag apparatus for a tire according to a first embodiment of the present invention. FIG. 4 is a view showing a radio frequency identification tag apparatus for a tire according to a second embodiment of the present invention. FIG. 5a is a plane perspective view of a tire in case the radio frequency identification tag for a tire of the first embodiment is inserted into the tire. FIG. 5b is a side perspective view of a tire in case the radio frequency identification tag for a tire of the first embodiment is inserted into the tire. FIG. 6a to 6d are views showing various shapes of a hole formed in the radio frequency identification tag according to the embodiments of the present invention.

Hereinafter, the present invention will be explained with reference to the drawings. Reference numeral 300 is a RFID tag according to the present invention. The RFID tag 300 of this invention comprises a substrate 305, a radio chip 301, a dipole antenna 303 (303-1 and 303-2) and holes 307.

The dipole antenna 303, the radio chip 301 and the holes 307 are located on the substrate 305. The dipole antenna 303 has symmetrically uniform flexions relative to the radio chip 301 located at the center of the substrate 305. The dipole antenna 303 sends and receives a radio signal to and from a reader. The size of the dipole antenna 303 is closely related to the frequency of the radio signal. The radio signal is transmitted using various carrier frequencies, and the current RFID system for a tire uses a carrier of a UHF band of 900 MHz. And, the dipole antenna 303 requires a minimum geometric shape as shown in FIG. 3 in order to secure proper gain and distance range. And, the shape and size of the dipole antenna 303 for a tire are dependent upon the material of the tire, the depth from the surface to the part which the RFID tag is inserted into in FIG. 5, the position of the dipole antenna over the tire width and the amount of an electron wave energy transmitted from the reader.

The holes 307 can be located in any part of the substrate 305. Only the holes 307 should be arranged so that the dipole antenna 303 and the radio chip 301 are not damaged. The holes 307 may be arranged in the areas between the flexions created by the flexion shape of the dipole antenna 303 as in the first embodiment of FIG. 3. The arrangement pattern of the holes 307 can be optionally formed so as to be symmetrical relative to the radio chip 301. The number of the holes 307 also can be optionally determined so that the holes 307 are symmetrical relative to the radio chip 301.

The holes 307 are formed on the substrate 305 and the rubber layers of the tire are vertically connected through the holes 307 in a vulcanization process of the tire, to thus form a supporting rod as shown in FIG. 5b. Because the supporting rod is formed through the holes 307 on the substrate 305, the adherability between the RFID tag 300 of a heterogeneous material and the tire can be improved and the RFID tag 300 can be secured so as not to move within the tire. Concretely, the supporting rod formed through the holes 307 prevents a secular change caused by a periodic flexion-extension shown upon traveling of the tire and keeps the position and shape of the antenna in an original state and in an optimum state.

Figure 6A:
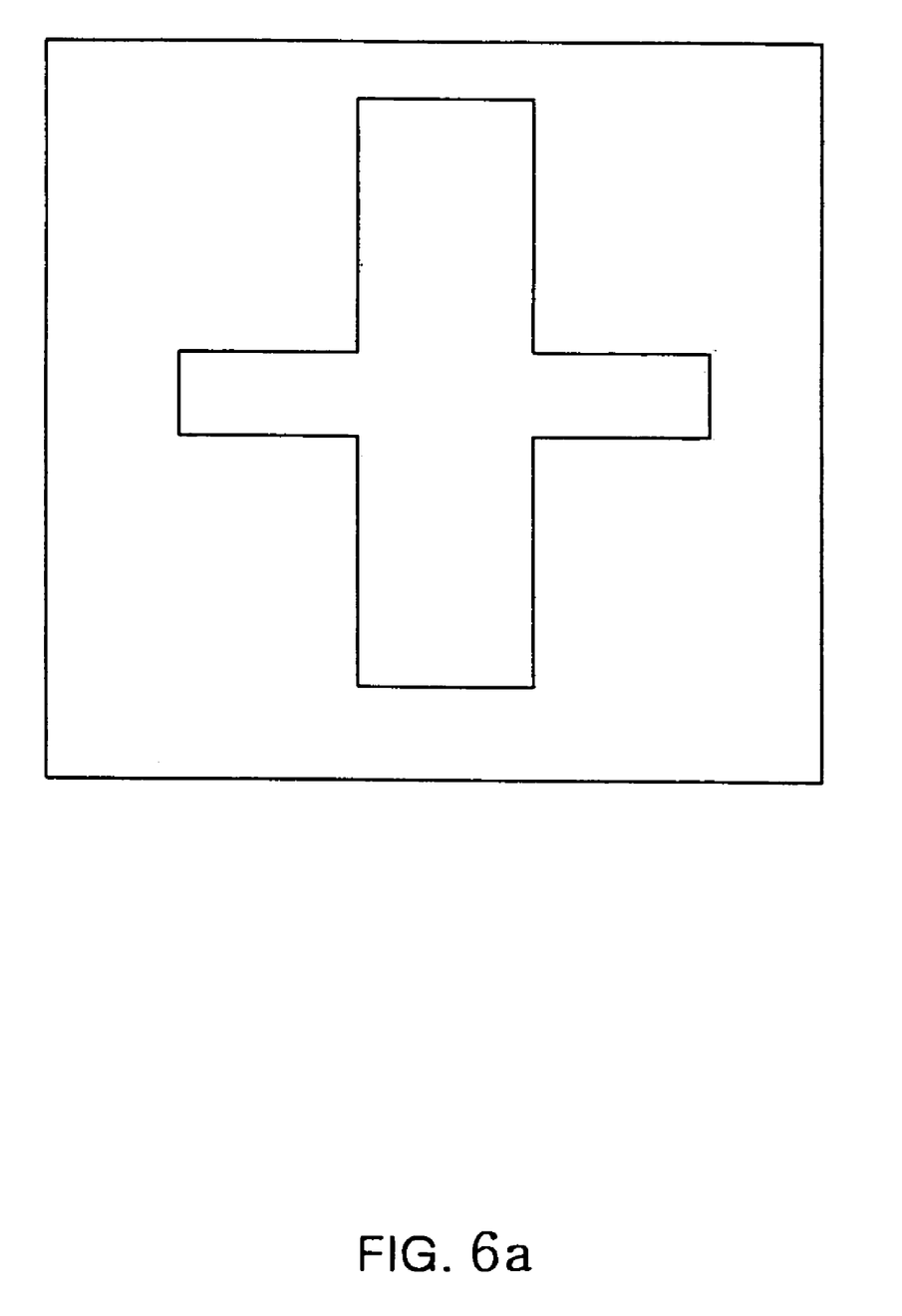
FIG. 6a is a view showing a first shape of a hole formed in the radio frequency identification tag according to the embodiments of the present invention.
Figure 6B:
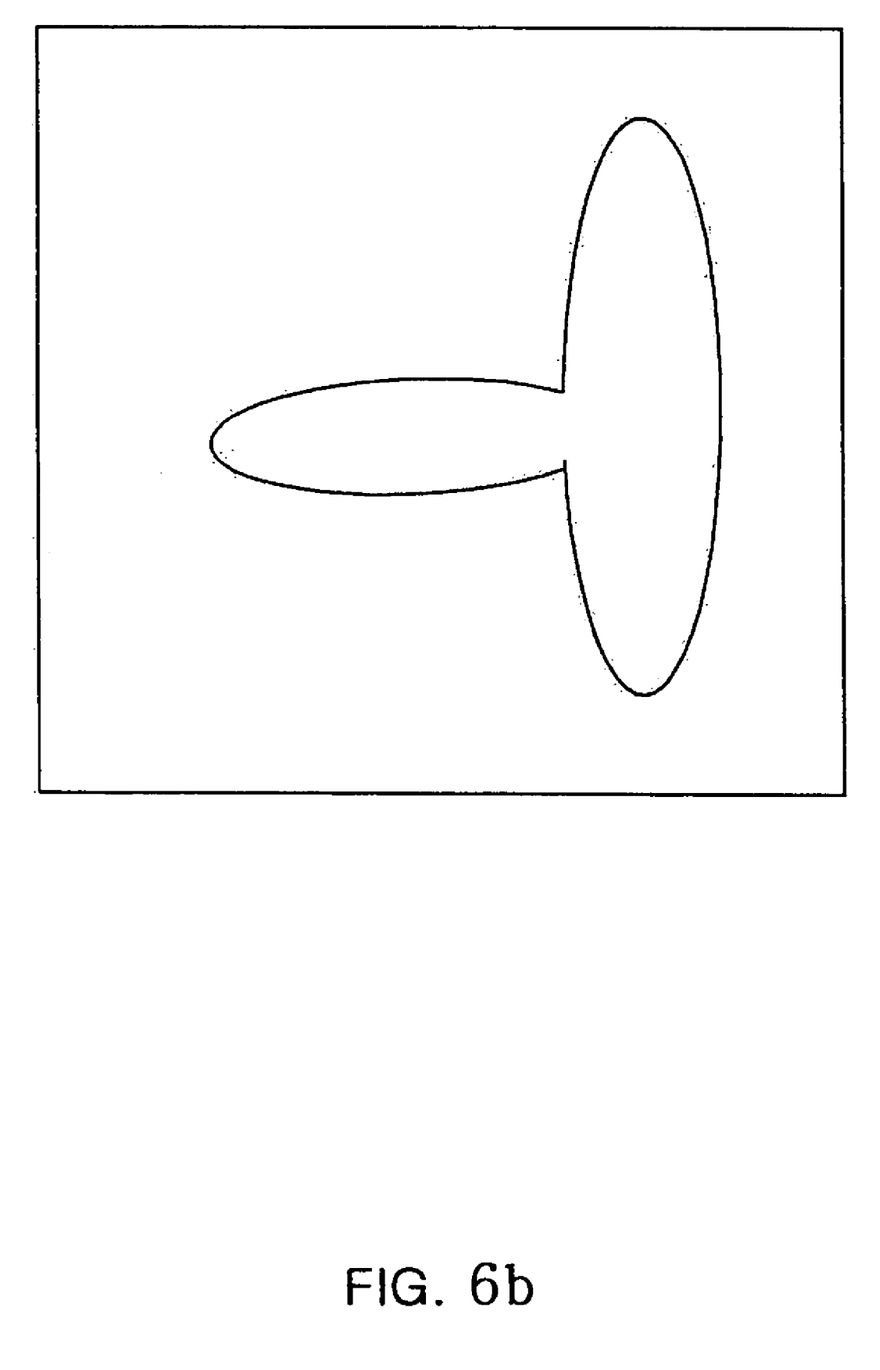
FIG. 6b is a view showing a second shape of a hole formed in the radio frequency identification tag according to the embodiments of the present invention.
Figure 6C:
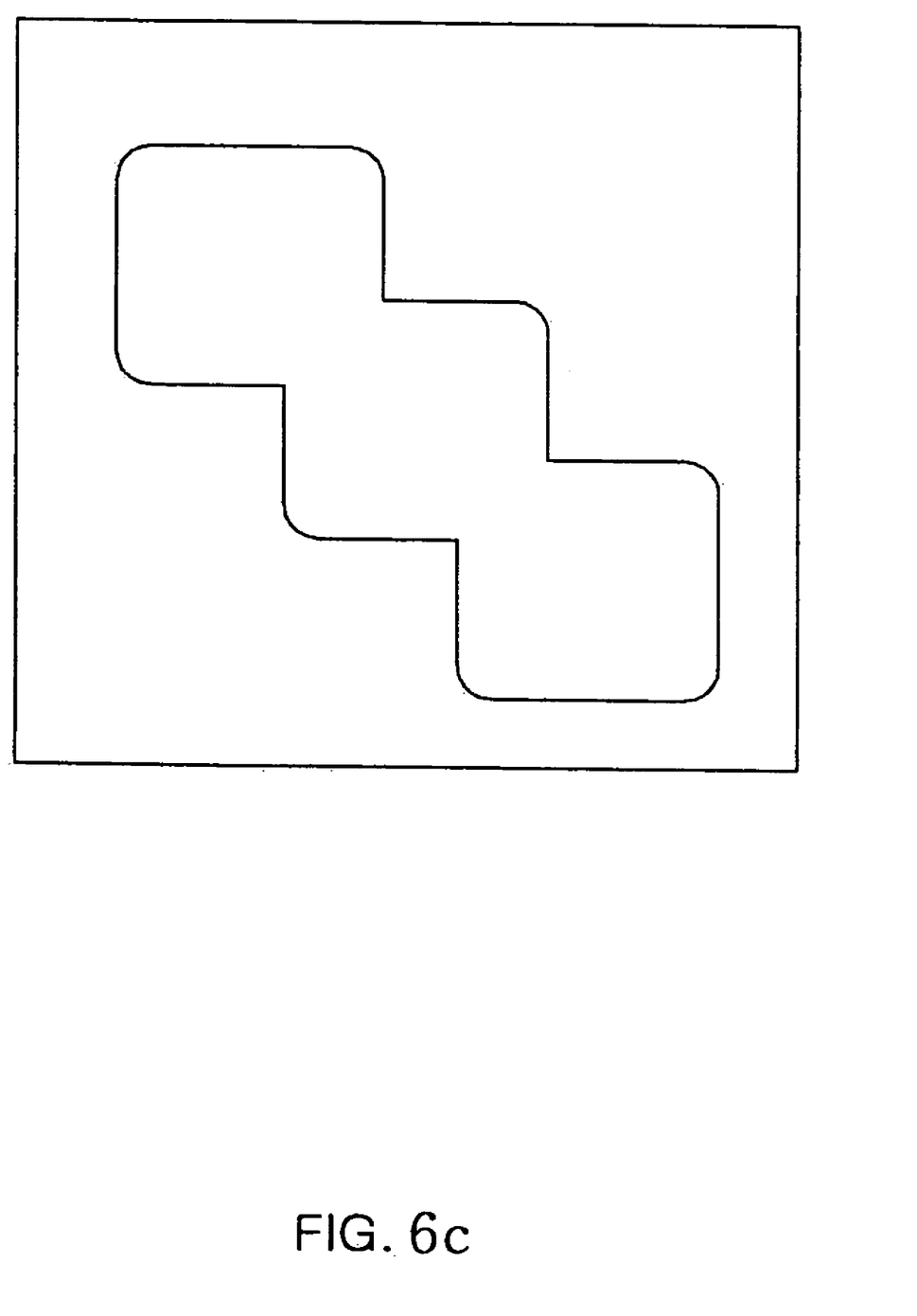
FIG. 6c is a view showing a third shape of a hole formed in the radio frequency identification tag according to the embodiments of the present invention.
Figure 6D:
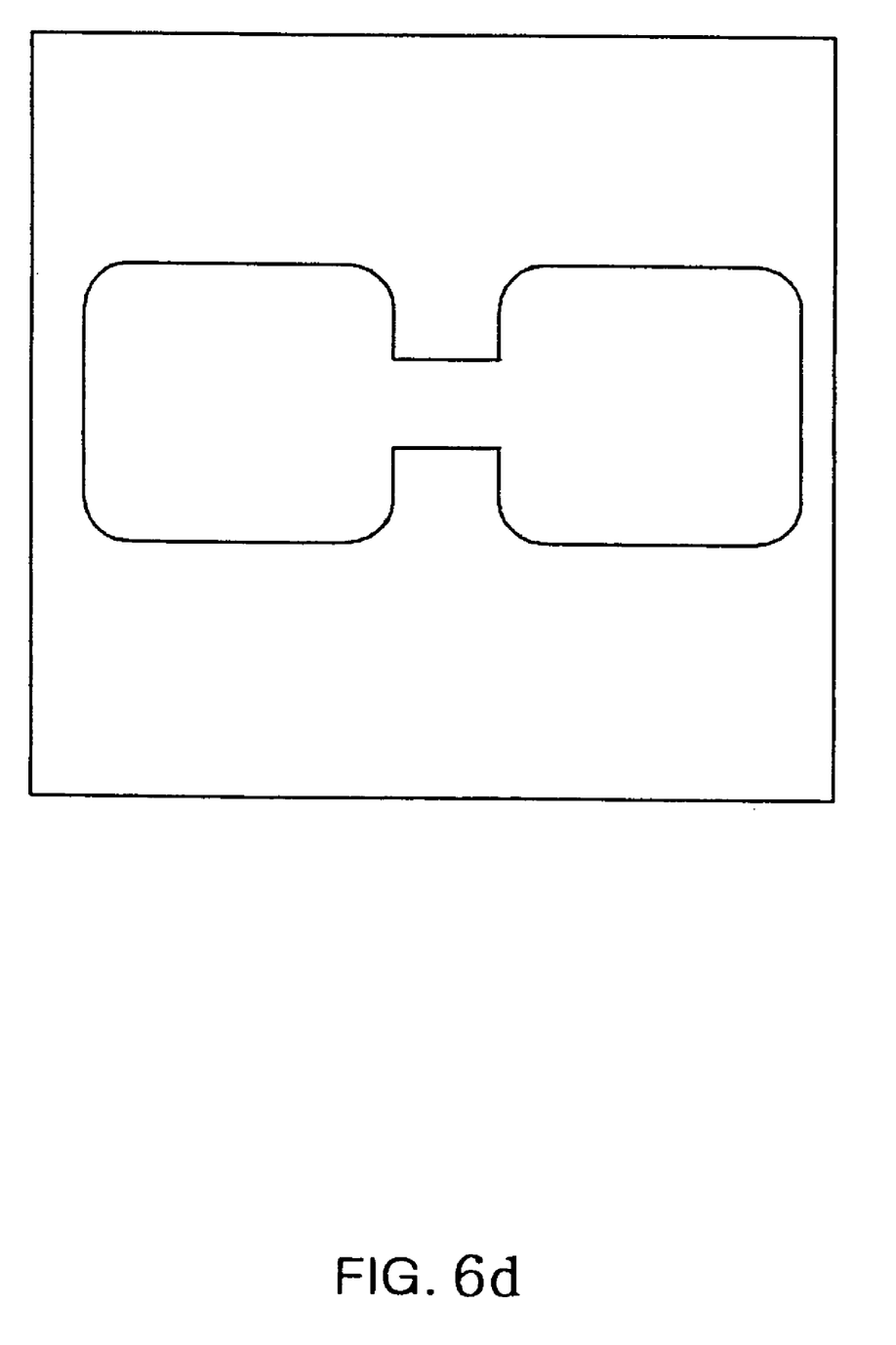
FIG. 6d is a view showing a fourth shape of a hole formed in the radio frequency identification tag according to the embodiments of the present invention.

The holes 307 formed on the substrate 305 may be formed in a round shape as shown in FIG. 3, in a cruciform as shown in FIG. 4 and FIG. 6a, in a thumbtack shape as shown in FIG. 6b, in a bug shape as shown in FIG. 6c and in a dumbbell shape as shown in FIG. 6d.

A surface wave is generated on the substrate 305 by an inductive voltage generated from the dipole antenna 303. The surface wave can be absorbed and reflected according to the type of the medium of the substrate 305 and the type of the rubber of the tire, and the impedance characteristics of the dipole antenna 303 can be changed by the absorption and reflection of the surface wave.

Consequently, the impedance characteristics of the dipole antenna 303 can be easily changed according to the position, interval and number of the holes 307. This will now be described with reference to FIG. 7.

Figure 7:
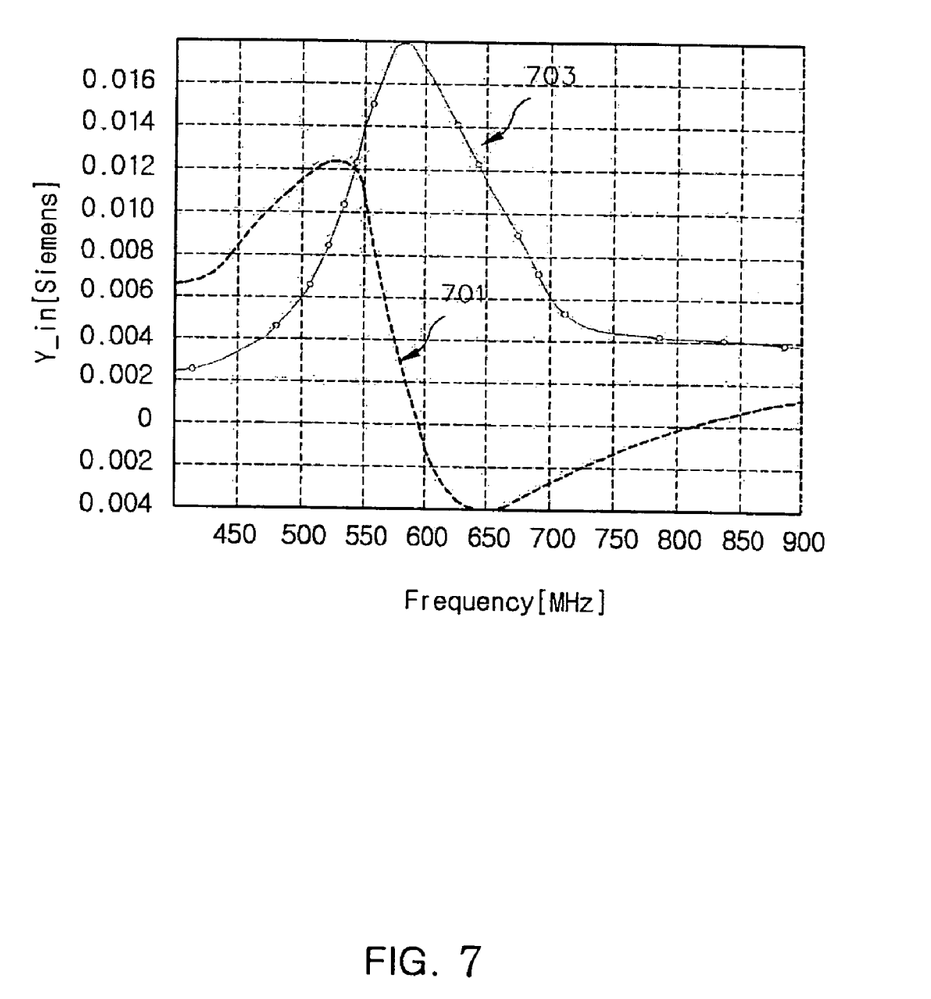
FIG. 7 is a view showing admittance characteristics per frequency band according to the embodiments of the present invention.

FIG. 7 is a view showing admittance characteristics per frequency band of a conventional RFID tag with no holes and admittance characteristics of the RFID tag with holes of the present invention.

Reference numeral 701 denotes a waveform exhibiting the antenna impedance characteristic of the conventional RFID tag with no holes, and reference numeral 703 denotes a waveform exhibiting the antenna impedance characteristic of the RFID tag with holes 307 of the present invention.

As shown in FIG. 7, it can be seen that the waveform 703 exhibiting the antenna impedance characteristic according to the present invention has a better antenna characteristic than the waveform 701 exhibiting the antenna impedance characteristic in the conventional art.

As described in detail above, in the present invention, the rubber mixed layers in a non-vulcanized state of the upper and lower surfaces surrounding the RFID tag are contacted through the holes in the vulcanization process of the tire to thus form a supporting rod. This can prevent a secular change caused by a period flexion-extension shown upon a continuous traveling from an aspect of the attributes of the tire and can keep the position and shape of the antenna in antenna in an original state and in an optimum state, thus keeping and enhancing the overall radio frequency characteristics even when in a long time use.

Furthermore, in the present invention, the impedance of the antenna can be controlled according to the position and arrangement pattern of the holes by forming the holes on the substrate of the RFID tag.

What is claimed is:

1. A radio frequency identification tag apparatus for a tire in a radio frequency identification system, which has a reader for generating a strong radio frequency signal to peripheral areas, comprising:
   a substrate with a plurality of holes having a predetermined shape;
   a radio chip housed in the substrate, storing the characteristic information of the tire, and operated upon receipt of the radio frequency signal to modulate the characteristic information and output them in the radio frequency signal received from the reader; and
   an antenna housed in the substrate, having a symmetrically uniform flexion shape relative to the radio chip, receiving the radio frequency signal to provide the same to the radio chip, and receiving the radio signal containing the characteristic information from the radio chip to transmit the same in midair, wherein the plurality of holes are arranged between the flexions of the antenna.

2. The apparatus of claim 1, wherein the plurality of holes is arranged at one side of the antenna.

3. The apparatus of claim 2, wherein the plurality of holes is formed symmetrical relative to the radio chip.

4. The apparatus of claim 3, wherein the holes are formed in a round shape.

5. The apparatus of claim 3, wherein the holes are formed in a cruciform.

6. The apparatus of claim 3, wherein the holes are formed in a thumbtack shape.

7. The apparatus of claim 3, wherein the holes are formed in a bug shape.

8. The apparatus of claim 3, wherein the holes are formed in a dumbbell shape.

9. The apparatus of claim 1, wherein the plurality of holes is formed symmetrical relative to the radio chip.

10. The apparatus of claim 9, wherein the holes are formed in a round shape.

11. The apparatus of claim 9, wherein the holes are formed in a cruciform.

12. The apparatus of claim 9, wherein the holes are formed in a thumbtack shape.

13. The apparatus of claim 9, wherein the holes are formed in a bug shape.

14. The apparatus of claim 9, wherein the holes are formed in a dumbbell shape.

15. A tire for an automobile, comprising a annular flexible body, and a radio frequency identification tag apparatus in a radio frequency identification system, which has a reader for generating a strong radio frequency signal to peripheral areas, wherein the radio frequency identification tag apparatus comprises:
   a) a substrate with a plurality of holes having a predetermined shape;
   b) a radio chip housed in the substrate, storing the characteristic information of the tire, and operated upon receipt of the radio frequency signal to modulate the characteristic information and output them in the radio frequency signal received from the reader; and
   c) an antenna housed in the substrate, having a symmetrically uniform flexion shape relative to the radio chip, receiving the radio frequency signal to provide the same to the radio chip, and receiving the radio signal containing the characteristic information from the radio chip to transmit the same in midair,
wherein the plurality of holes are arranged between the flexions of the antenna, and wherein the radio frequency identification tag apparatus is embedded in the annular flexible body of the tire.

* * * * *